(12) United States Patent  
Banak et al.

(10) Patent No.: US 8,537,517 B1
(45) Date of Patent: Sep. 17, 2013

(54) SYSTEM AND METHOD FOR FAST-ACTING POWER PROTECTION

(75) Inventors: Michael Alan Banak, Oak Lawn, IL (US); Vallangiman Venkataraman Srinivasan, San Francisco, CA (US)

(73) Assignee: Manufacturing Networks Incorporated, Santa Clara, CA (US)

( * ) Notice: Subject to any disclaimer, the term of this patent is extended or adjusted under 35 U.S.C. 154(b) by 332 days.

(21) Appl. No.: 13/094,566

(22) Filed: Apr. 26, 2011

(51) Int. Cl.
*H02H 3/08* (2006.01)

(52) U.S. Cl.
USPC ........................................................ 361/93.1

(58) Field of Classification Search
USPC ........................................................ 361/93.1
See application file for complete search history.

(56) References Cited

U.S. PATENT DOCUMENTS 5,440,441 A * 8/1995 Ahuja ............................. 361/62
5,629,542 A * 5/1997 Sakamoto et al. ............ 257/328
6,518,731 B2   2/2003 Thomas et al.
7,576,962 B2   8/2009 Harris

* cited by examiner

*Primary Examiner* — Rexford Barnie
*Assistant Examiner* — Tien Mai
(74) *Attorney, Agent, or Firm* — Invent Capture, LLC.; Samuel S. Cho

(57) ABSTRACT

A fast-acting power protection system and a related method of power protection are disclosed. In one embodiment of the invention, the fast-acting power protection system includes a current limiting block capable of reducing or shutting down an unwanted current or voltage surge at an input terminal of the fast-acting power protection system. The fast-acting power protection system also integrates an output voltage clamp and the current limiting block in one piece of monolithic semiconductor material, wherein the output voltage clamp protects an electrical device connected to an output terminal of the fast-acting power protection system from an unwanted voltage surge by rapidly clamping an output voltage to a clamp voltage. Furthermore, the fast-acting power protection system also protects from a reverse polarity input voltage and dielectrically isolates a MOSFET for reverse polarity protection from other current-limiting MOSFET's inside the current limiting block.

13 Claims, 6 Drawing Sheets

300

Pin Descriptions

| Pin Number | Pin Name | Pin Function |
|---|---|---|
| 1, 2 | VOUT | $V_{OUT}$ = Zener regulated voltage output |
| 6, 7, 8, 9, 10 | GND | GND, shared between input and output |
| 4, 5 | VIN | $V_{IN}$ = Input to I-Limiter & Zener diode |

400

| | Vzener (V) | | IZt(1) (A) | IHOLD @ 20°C (A) | Operating Current | | RTyp (Ω) |
|---|---|---|---|---|---|---|---|
| Min. | Typ. | Max. | | | Test Voltage | Max Current (mA) | |
| 5.7 | 5.8 | 6.0 | 0.1 | 1.3 | 5.0 | 0.50 | 0.12 |

| RMax (Ω) (Over the Product Life) | TYPICAL PROTECTION THRESHOLDS | | I/V FLT MAX | | Tripped Power Dissipation Max | |
|---|---|---|---|---|---|---|
| | Current / Voltage | Hysteresis Current / Voltage | Current | Voltage | (A) | Test Voltage |
| 0.15 | 1.5A / 5.5V | 50mA / 50mV | + 6 A –N/A* | +24V -20V | 1.0 | 24 |

1) Izt is the current at which Vzener is measured.

2) Typical operating current is 0.50 mA @ 5.0V Test Voltage, which meets USB suspend mode requirement.

FIG. 5

SYSTEM AND METHOD FOR FAST-ACTING POWER PROTECTION

BACKGROUND OF THE INVENTION

The present invention generally relates to power protection systems for electrical devices. More specifically, the invention relates to one or more embodiments of a novel fast-acting power protection system and a related method for protection of an electrical device against voltage/current surges or reverse polarity input connections.

Many electrical devices today operate in environments susceptible to unwanted and dangerous power surges or accidental reverse polarity input connections. If power surges, which may involve a voltage surge, a current surge, or both, are sufficiently high or prolong beyond a negligible duration, electrical devices subject to power surges can sustain operation failure or permanent damages. Therefore, protection against power surges have been commonly addressed by conventional fuses with thermal or magnetic elements, which are designed to cut off incoming electrical power.

One example of a conventional fuse is a polymeric positive temperature coefficient (PPTC) device, which exhibits a high inherent resistance than a metallic fuse or a circuit breaker. Therefore, while PPTC's are used in applications where slow power protection responses are acceptable, they are often undesirable in electronic circuits which require fast power protection responses and high energy efficiencies. Relays have been also incorporated in some electrical systems to block current or voltage surges bidirectionally. Furthermore, a transient blocking unit (TBU) is also used to protect sensitive electrical circuits which require higher performance parameters than what can be satisfied with conventional fuses or relays.

Earlier designs for transient blocking units (TBU's) were unable to perform a reset in case of a short-lived transient power surge event, thereby inconveniencing device users. Furthermore, most TBU designs are generally incapable of protecting electrical circuits if a power surge event is sufficiently prolonged (i.e. non-transient). Newer TBU designs, such as a design disclosed by U.S. Pat. No. 7,576,962, incorporates a reset feature as an effort to provide more control for surge event protection.

In most of the conventional power protection system designs, including conventional fuses, relays, and TBU's, it is difficult to achieve a fast, stiff, and durable surge protection responses. Because conventional power protection system designs tend to involve at least some discrete components such as a discrete package polymer-based device, a reduction or a shut-down of over-current and/or over-voltage event is often slower than desirable. Furthermore, conventional power protections also typically suffer from fatigue and incremental degradation in protection performances over time.

Accordingly, a novel power protection system and a related method which provide a rapid and reliable voltage, current, and reverse polarity protection may advantageous. Furthermore, a novel power protection system and a related method which enables a lower footprint and a lower energy consumption by reducing or eliminating discrete package polymers in a protection circuit may also be advantageous.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method of protecting an electrical device from a power surge is disclosed. This method comprises the steps of: connecting an input terminal of a fast-acting power protector to an electrical source, wherein the fast-acting power protector is a monolithic semiconductor chip integrating an output voltage clamp and a current limiting block, and wherein at least one pair of common-drain series MOSFET's, which blocks a forward current surge, is dielectrically isolated from a MOSFET for reverse polarity protection inside the current limiting block; connecting an output terminal of the fast-acting power protector to the electrical device for power surge protection; and determining whether an incoming electrical current multiplied by a sense resistor value (Rsense) is approximately equal to a surge protection trigger voltage (Vos) for a current trip.

Furthermore, in this embodiment of the invention, if the incoming electrical current multiplied by the sense resistor value (Rsense) is approximately equal to the surge protection trigger voltage (Vos) for the current trip, then this method uses at least one pair of common-drain series MOSFET's and at least one reverse-protection diode in the current limiting block of the monolithic semiconductor chip to reduce or shut down the incoming electrical current as a current surge protection; and if a voltage coming out of the current limiting block is surging higher than a clamp output voltage of the output voltage clamp at the output terminal of the fast-acting power protector, then this method holds down the voltage coming out of the current limiting block to the clamp output voltage at the output terminal to the clamp output voltage of the output voltage clamp as a voltage surge protection of the electrical device connected to the output terminal of the fast-acting power protector.

In another embodiment of the invention, a fast-acting power protector system for an electrical device is disclosed. This fast-acting power protector system comprises an input terminal configured to receive an incoming electrical current and voltage; an output terminal configured to transmit an outgoing electrical current and voltage; a current limiting block comprising a plurality of common-drain series MOSFET's configured to reduce or shut down an incoming electrical current into the input terminal in case of a current trip event, wherein the current limiting block also includes an additional MOSFET for reverse polarity protection; an output voltage clamp configured to clamp an output voltage at the output terminal to a clamp voltage value if the output voltage begins to surge above the clamp voltage value or another voltage surge protection threshold value; and a single piece of monolithic semiconductor material incorporating the current limiting block and the output voltage clamp, wherein the plurality of common-drain series MOSFET's and the additional MOSFET are dielectrically isolated from each other in the current limiting block to prevent substrate injection and latchup prevention in case of a reverse polarity voltage at the input terminal.

BRIEF DESCRIPTION OF DRAWINGS

FIG. 5 shows an example of electrical characteristics for a fast-acting power protection system in accordance with an embodiment of the invention.

DETAILED DESCRIPTION

Figure 1:
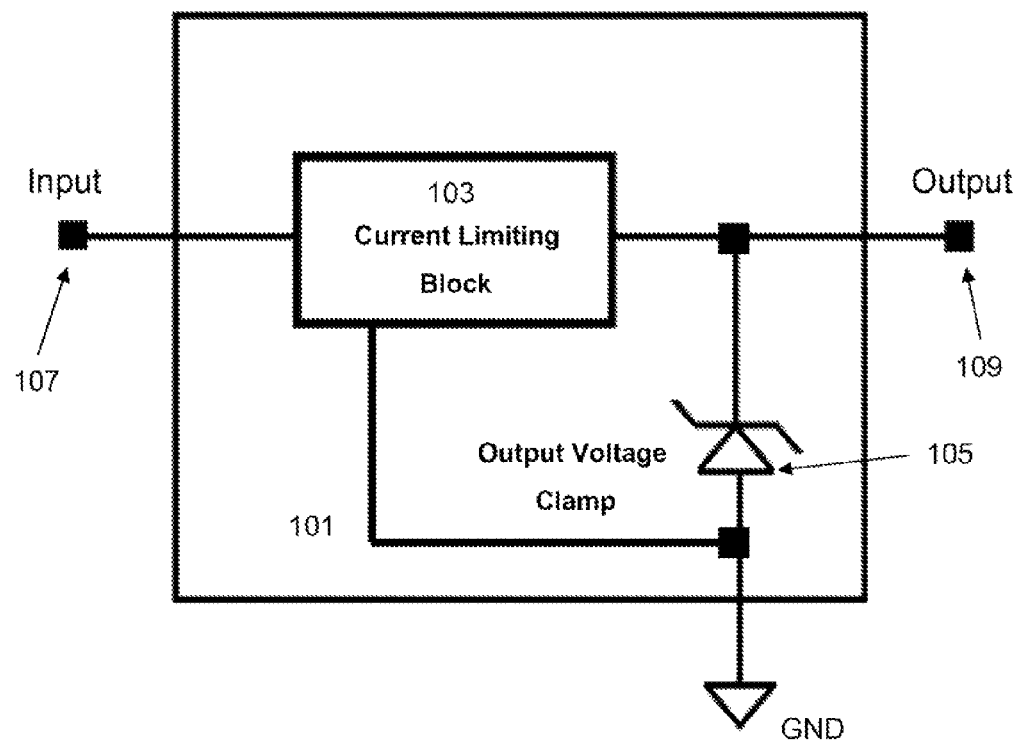
FIG. 1 shows a high-level block diagram of a fast-acting power protection system in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble a novel power protection system for an electrical device and/or a related method of protecting an electrical device using the novel power protection system. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "power surge" is defined as a spike in voltage, current, or both. An example of a power surge is a voltage or current spike at an input terminal of an electrical device caused by an external power source, an external electrical signal, or a sudden change in environment such as lightening or storm.

Furthermore, for the purpose of describing the invention, a term "current limiting block" is defined as a protective electrical circuit configured to limit an output current coming out of the electrical circuit if an input of the protective electrical circuit experiences a power surge (i.e. a current surge and/or a voltage surge). In a preferred embodiment of the invention, the current limiting block comprises enhancement-mode MOSFET's (metal oxide semiconductor field effect transistor) connected in series with a common drain, and one or more Schottky diodes for blockage of current through additional control MOSFET's to protect against a reverse polarity event. This current limiting block is able to drastically reduce or shut down a spiking current after a detection of a power surge.

In addition, for the purpose of describing the invention, a term "output voltage clamp" is defined as an electrical unit configured to clamp an output voltage to a clamp voltage value at an output terminal of a fast-acting power protector system to protect an electrical device connected to the output terminal, if an unwanted voltage surge is detected. In a preferred embodiment of the invention, the output voltage clamp is a Zener diode which is monolithically integrated into a single piece of semiconductor material along with the current limiting block, wherein a MOSFET for reverse input polarity protection and other MOSFET's for blocking forward current surges are dielectrically isolated from each other to minimize undesirable parasitic junction capacitance and leakage currents. In the preferred embodiment of the invention, a Zener voltage, or a Zener breakdown voltage, of the Zener diode is the clamp voltage value. In another embodiment of the invention, the output voltage clamp is a compound device that performs a voltage clamping function. If the compound device is the output voltage clamp instead of a Zener diode, one advantage may be having a less current leakage than a typical Zener diode in a low Zener voltage application (e.g. Vz <5.6V).

Moreover, for the purpose of describing the invention, a term "current trip" is defined as an act of drastically reducing or shutting down an incoming current or a surging current for power protection of an electrical device.

One aspect of an embodiment of the present invention is providing a novel power protection system which rapidly lowers or shuts down a surging input current, while minimizing current leak to an electrical device protected by the novel power protection system.

Another aspect of an embodiment of the present invention is providing a fast, stiff, and durable output voltage clamping at an output terminal of the novel power protection system during a power surge, without fatigue and incremental resistance aging issues experienced by conventional polymeric positive temperature coefficient (PPTC) devices.

Yet another aspect of an embodiment of the present invention is providing a small-footprint, energy-efficient, fast-acting, and monolithically-integrated novel power protection system, which dielectrically isolates a MOSFET for input polarity reversal protection in a current limiting block from other circuitry inside the current limiting block responsible for blocking forwarded current surges. In addition, the dielectrical isolation can also apply between the current limiting block and an output voltage clamp in the monolithically-integrated novel power protection system.

In addition, another aspect of an embodiment of the present invention is providing a novel method of rapidly reducing or shutting down an incoming electrical current and clamping an output voltage to a clamp voltage during an undesirable power surge.

Furthermore, another aspect of an embodiment of the present invention is providing a fault-interrupt mode and/or a self-recovery mode as reset options for a novel power protection system.

FIG. 1 shows a high-level block diagram (100) of a fast-acting power protection system in accordance with an embodiment of the invention. In a preferred embodiment of the invention, the fast-acting power protection system comprises a current limiting block (103) and an output voltage clamp (105), each block of which may be dielectrically isolated in a monolithic semiconductor chip (101). By integrating the current limiting block (103) and the output voltage clamp (105) into the monolithic semiconductor (e.g. silicon-based) chip (101) using dielectric isolation (DI) process, such as V-Groove dielectric isolation, silicon-on-insulator (SOI), and/or epitaxial lateral overgrowth (ELO), parasitic junction capacitance and leakage currents can be minimized for the fast-acting power protection system.

It should be noted that conventional transient blocking units (TBU's) are unable to integrate an output voltage clamp into one chip, and therefore the reaction time of current reduction and voltage clamping are substantially slower. Furthermore, conventional polymeric positive temperature coefficient (PPTC) devices are mostly discrete components and also suffer from slow reaction time for power protection. Therefore, the reduction of parasitic junction capacitance and leakage currents by dielectrically isolating a MOSFET for reverse input polarity protection from other MOSFET's for blocking current surges in the current limiting block (103) in a single monolithic chip (e.g. 101), which also includes the output voltage clamp (105) as embodied by the present invention, enables faster response time (i.e. in form of current reduction, shut-down, and/or output voltage clamping) against a dangerous power surge and also provide additional energy efficiencies to one or more embodiments of the present invention. Furthermore, integration of the current limiting block (103) and the output voltage clamp (105) in the monolithic semiconductor chip (101) enable the fast-acting power protection system to be miniaturized for microelectronic applications, as illustrated by an application example (300) of the fast-acting power protection system (301) inside a USB device in FIG. 3.

Continuing with FIG. 1, in the preferred embodiment of the invention, the current limiting block (103) at least comprises a plurality of common-drain series MOSFET's operating in enhancement modes, which reduce or shut down an incoming electrical current into the input terminal in case of a current trip event. The current trip event may occur if there is an unwanted power surge or a dangerous reverse polarity voltage inputs at an input terminal (107) of the fast-acting power protector system.

In one embodiment of the invention, the current limiting block (103) further comprises a first op-amp comparator and a sense resistor ($R_{sense}$) to trigger the current trip event, if the incoming electrical current multiplied by a resistance value of the sense resistor ($R_{sense}$) is approximately equal to the surge protection trigger voltage (Vos). Furthermore, in one embodiment of the invention, the current limiting block (103) also includes a flip-flop with a set (S) input operatively connected to the first op-amp comparator, a reset (R) input operatively connected to a reset logic, and an output (Q) operatively connected to one or more MOSFET's configured to reduce or shut down the incoming electrical current into the input terminal in case of the current trip event. The reset logic may have a second op-amp comparator which compares an input voltage and a targeted reset threshold voltage and outputs a reset enable signal if the input voltage falls below the targeted reset threshold voltage. In addition, the current limiting block (103) further comprises one or more Schottky diodes operatively connected to the plurality of common-drain series MOSFET's, wherein the one or more Schottky diodes protect any MOSFET's from reverse current in a reverse input polarity event. The current limiting block (103) is able to reduce or shut down the incoming electrical current into the input terminal in case of the current trip event.

Continuing with FIG. 1, in the preferred embodiment of the invention, the output voltage clamp (105) is a Zener diode voltage clamp operatively connected to an output terminal (109) of the fast-acting power protector system. In another embodiment of the invention, the output voltage clamp (105) is a compound device that performs a voltage clamping function. In the preferred embodiment of the invention, the output voltage clamp (105) is configured to hold down or "clamp" the voltage coming out of the current limiting block (103) to a Zener voltage of the Zener diode voltage clamp (e.g. 105) at the output terminal (109) as a voltage surge protection of an electrical device connected to the output terminal (109), if an unwanted power surge occurs at an input terminal (107). Furthermore, in the preferred embodiment of the invention, the Zener diode voltage clamp (e.g. 105) is referenced to ground (GND) and provides a fast and durable voltage surge protection to the electrical device. In one embodiment of the invention, voltage clamping to a certain clamp voltage value (e.g. a Zener voltage) is triggered if the output voltage begins to surge above the clamp voltage value or another voltage surge protection threshold value.

Figure 2:
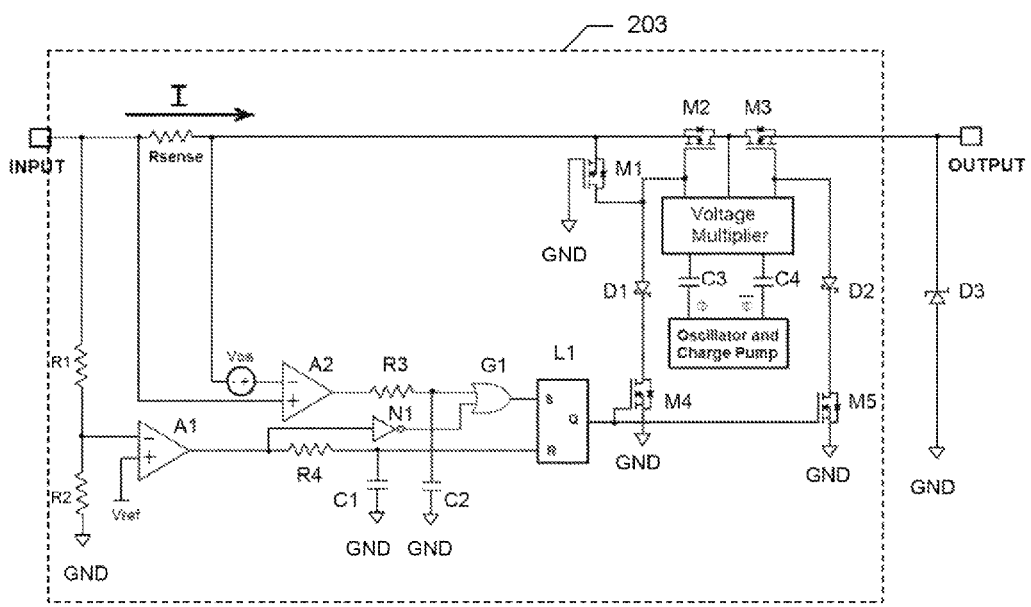
FIG. 2 shows an example of a detailed schematic of a current limiting block and a voltage clamping device in accordance with an embodiment of the invention.

FIG. 2 shows an example of a detailed schematic (200) of a current limiting block (203) and a voltage clamping device (D3) in accordance with an embodiment of the invention. In a preferred embodiment of the invention, the current limiting block (203) at least comprises a plurality of common-drain series MOSFET's (e.g. M2, M3) operating in enhancement modes, which reduce or shut down an incoming electrical current into the input terminal (INPUT) in case of a current trip event, which may occur if there is an unwanted power surge or a dangerous reverse polarity voltage inputs at the input terminal (INPUT) of the fast-acting power protector system.

Moreover, in one embodiment of the invention, the plurality of common-drain series MOSFET's (e.g. M2, M3) is also operatively connected to an additional MOSFET (M1) with its gate grounded (GND) for input polarity reversal protection. Furthermore, in one embodiment of the invention, the plurality of common-drain series MOSFET's (e.g. M2, M3) and/or the additional MOSFET (M1) can also be operatively connected to a Voltage Multiplier which is operatively connected through one or more capacitors (e.g. C3, C4) and an Oscillator and Charge Pump unit for effective current reduction in case of a current trip event. In addition, the plurality of common-drain series MOSFET's (e.g. M2, M3) and/or the additional MOSFET (M1) may also be operatively connected through one or more reverse-protection Schottky diodes (e.g. D1, D2) which are further connected to other grounded MOSFET's (e.g. M4, M5) for a rapid and durable shut down of currents in case of a current trip event.

In one embodiment of the invention, the current limiting block (203) further comprises a first op-amp comparator (A2) and a sense resistor ($R_{sense}$) to trigger the current trip event, if the incoming electrical current (I) multiplied by a resistance value of the sense resistor ($R_{sense}$) is approximately equal to the surge protection trigger voltage (Vos). In addition, the output of the first op-amp comparator (A2) may also be operatively connected through a delay circuit comprising an additional resistor (R3) and a capacitor (C2) coupled to the ground to prevent nuisance responses. Furthermore, in one embodiment of the invention, the current limiting block (203) also includes a flip-flop (L1) with a set (S) input operatively connected to the first op-amp comparator (A2), a reset (R) input operatively connected to a reset logic, and an output (Q) operatively connected to one or more MOSFET's configured to reduce or shut down the incoming electrical current into the input terminal in case of the current trip event.

In a preferred embodiment of the invention, the reset logic may have a second op-amp comparator (A1) which compares an input voltage and a targeted reset threshold voltage (e.g. $V_{ref}$) and outputs a reset enable signal if the input voltage falls below the targeted reset threshold voltage. Furthermore, the output of the second op-amp comparator (A1) may also be operatively connected to a delay circuit comprising an additional resistor (R4) and a capacitor (C1) coupled to the ground to tailor the recovery time (e.g. controlling nuisance responses). In one embodiment of the invention, the input voltage signal (e.g. an over-voltage signal) may also be operatively connected through an inverse gate (N1) and an input of a two-terminal OR gate (G1), which is connected to the set (S) input of the flip-flop (L1).

In a fault interrupt mode for operating the fast-acting power protection system after a current trip event, if the input voltage into the input terminal (INPUT) falls below the targeted reset threshold voltage (e.g. $V_{ref}$), the fast-acting power protection system may be reset to a normal operation mode prior to the current trip event for passing input voltage and current at the input terminal (INPUT) to the output terminal (OUTPUT). In the preferred embodiment of the invention, as illustrated in FIG. 2, the current trip event (i.e. alternatively called a "fault state") does not clear and reset to the normal operation mode until V(INPUT)×alpha falls below $V_{ref}$ value, wherein alpha=R2/(R1+R2). In another embodiment of the invention, the fast-acting power protection system may operate in a self-recovery mode, which involves a step of resuming the normal operation mode, or a flow of an incoming electrical current from the input terminal (INPUT) to the output terminal (OUTPUT) of the fast-acting power protection after a set period of time, if the current surge protection or the current trip event were triggered previously.

Continuing with FIG. 2, in the preferred embodiment of the invention, the output voltage clamp (D3) is a low-resistance Zener diode voltage clamp referenced to the ground (GND) and is also operatively connected to the output terminal (OUTPUT) of the fast-acting power protector system. In another embodiment of the invention, the output voltage clamp (D3) is a compound device that performs a voltage clamping function. In the preferred embodiment of the invention, the output voltage clamp (D3) is configured to hold down or "clamp" the voltage coming out of the current limiting block (203) to a Zener voltage (e.g. 5.6 V Zener breakdown) of the Zener diode voltage clamp (D3) at the output terminal (OUTPUT) as a voltage surge protection of an electrical device connected to the output terminal (OUTPUT), if an unwanted power surge occurs at the input terminal (INPUT). Furthermore, in the preferred embodiment of the invention, the Zener diode voltage clamp (e.g. D3) is referenced to ground (GND) and provides a fast and durable voltage surge protection to the electrical device. In one embodiment of the invention, voltage clamping to a certain clamp voltage value (e.g. a Zener voltage) is triggered if the output voltage begins to surge above the clamp voltage value or another voltage surge protection threshold value.

Furthermore, in one embodiment of the invention, the detailed schematic (200) of the current limiting block (203) and the voltage clamping device (D3) can be described as a method of protecting an electrical device from a power surge, which comprises following steps:

a) connecting an input terminal (INPUT) of a fast-acting power protector to an electrical source, wherein the fast-acting power protector is a monolithic semiconductor chip integrating and dielectrically isolating a MOSFET (i.e. M1) for reverse polarity protection from other MOSFET's (i.e. M2, M3) for blocking forward current surges to prevent latchup and high-current forwarding biasing in a current limiting block (203), and wherein a Zener diode voltage clamp (D3) and a current limiting block (203) is optionally diectrically isolated inside the monolithic semiconductor chip. The dielectric isolation within the current limiting block (203) can prevent substrate injection, for example, during a reverse input polarity current surge which may cause latchup otherwise.

b) connecting an output terminal of the fast-acting power protector to the electrical device for power surge protection;

c) determining whether an incoming electrical current multiplied by a sense resistor value (Rsense) is approximately equal to a surge protection trigger voltage (Vos) for a current trip;

If the incoming electrical current multiplied by the sense resistor value ($R_{sense}$) is approximately equal to the surge protection trigger voltage ($V_{os}$) for the current trip, then the fast-acting power protector uses at least one pair of common-drain series MOSFET's (e.g. M2, M3) and at least one reverse-protection Schottky diode (e.g. D1, D2) in the current limiting block (203) of the monolithic semiconductor chip to reduce or shut down the incoming electrical current as a current surge protection. Furthermore, if a voltage coming out of the current limiting block (203) is surging higher than a Zener voltage of the Zener diode voltage clamp (D3) at the output terminal (OUTPUT) of the fast-acting power protector, then the fast-acting power protector can hold down the voltage coming out of the current limiting block (203) to the Zener voltage to clamp voltage at the output terminal (OUTPUT) to the Zener voltage of the Zener diode voltage clamp (D3) as a voltage surge protection of the electrical device connected to the output terminal of the fast-acting power protector.

In addition, the method of protecting an electrical device from a power surge as described above can further comprise a step of blocking the incoming electrical current inside the current limiting block (203) using an additional MOSFET (M1) if an input polarity at the input terminal of the fast-acting power protector is reversed or reverse-biased relative to a correct input polarity. The additional MOSFET (M1) may detect a polarity reversal across its gate-source nodes, and upon detection of the polarity reversal, the additional MOSFET (M1) turns on, thereby holding off nearby MOSFET (e.g. M2) and blocking any reverse high currents.

Moreover, this power protection method can also add a step of allowing the incoming electrical current to follow uninterrupted from the input terminal to the output terminal of the fast-acting power protector, if the incoming electrical current multiplied by the sense resistor value ($R_{sense}$) is less than the surge protection trigger voltage ($V_{os}$) for the current trip and if the voltage coming out of the current limiting block (203) is not higher than the Zener voltage of the Zener diode voltage clamp (D3) at the output terminal of the fast-acting power protector.

Figure 3:
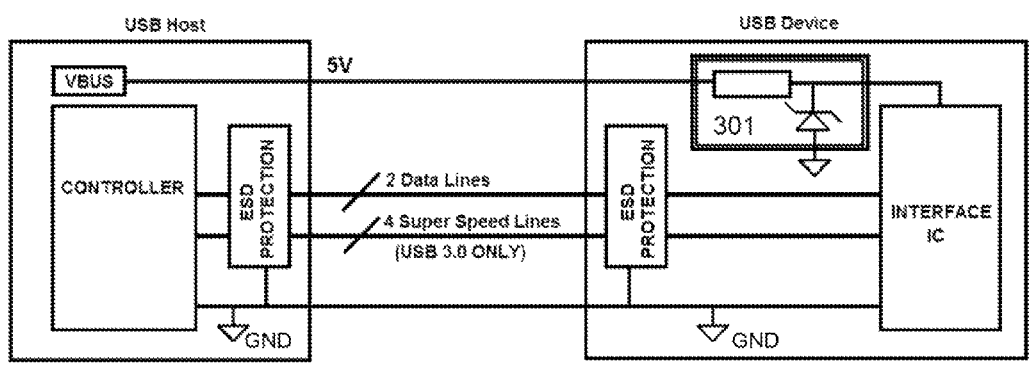
FIG. 3 shows an example of an application involving a fast-acting power protection system integrated into a USB device in accordance with an embodiment of the invention.

FIG. 3 shows an example of an application (300) involving a fast-acting power protection system (301) integrated into a USB device in accordance with an embodiment of the invention. In this application (300), the fast-acting power protection system (301) is sufficiently miniaturized to be integrated into a USB device, which may also includes an Interface IC (i.e. an example of an electrical device connected to the output terminal of the fast-acting power protection system) and an electrostatic discharge (ESD) protection block. Examples of USB devices include, but are not limited to, a USB flash drive, a USB wireless communication modem, or another USB standard-compliant device. Examples of USB standards include, but are not limited to, USB 1.0, 2.0, and 3.0 standards. In the preferred embodiment of the invention, the fast-acting power protection system (301) comprises a monolithically integrated single-chip current limiting block (e.g. 203) and an output voltage clamp (e.g. D3), which meet a USB suspend mode current requirement of 200 micro-amps current at 5.0V operating voltage under a normal mode of operation.

As shown in FIG. 3, a voltage bus (VBUS) from a USB host (e.g. a computer with a USB port) may supply an incoming electrical voltage (5V) and a corresponding incoming electrical current into an input terminal of the fast-acting power protector system (301). Under a normal operating mode, the fast-acting power protector system (301) largely carries the incoming electrical voltage and the corresponding incoming electrical current to the Interface IC via an output terminal of the fast-acting power protector system (301). In case of a power surge event, the fast-acting power protection system (301) uses a current limiting block (e.g. 203) and an output voltage clamp (e.g. D3) for rapid and stiff current limiting and voltage clamping as described for FIG. 1 and FIG. 2. Furthermore, various parts of the current limiting block and the output voltage clamp inside the fast-acting power protection system (301) are grounded for efficient current limiting and voltage clamping in a power surge event.

Figure 4:
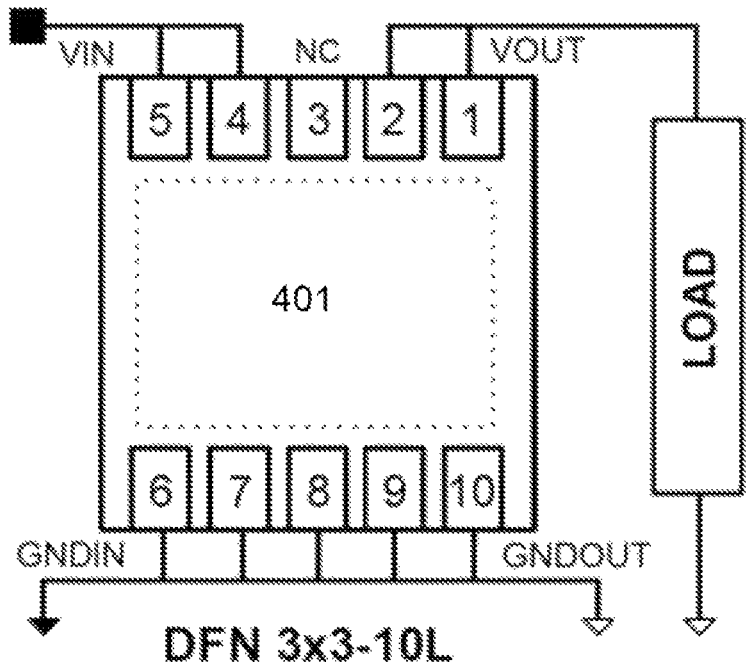
FIG. 4 shows an example of a pin layout for a fast-acting power protection system in accordance with an embodiment of the invention.

FIG. 4 shows an example of a pin layout (400) for a fast-acting power protection system in accordance with an embodiment of the invention. In the embodiment of the invention as shown in FIG. 4, the pin layout (400) is a DFN 3×3-10L package, which encapsulates a current limiting block (e.g. 203) and an output voltage clamp (e.g. D3) in a monolithically-integrated single semiconductor chip. The output voltage clamp in this particular example is a Zener diode referenced to the ground. As shown in "Pin Descriptions" table in FIG. 4, $V_{in}$ is an input voltage pin supplying an input voltage to an input terminal of the fast-acting power protection system, and $V_{out}$ is a power-protected output voltage pin supplying an output voltage to an electrical device connected to the fast-acting power protection system. GND is a ground connection for various ground connections within the fast-acting power protection system.

FIG. 5 shows an example of electrical characteristics for a fast-acting power protection system for a particular test condition in accordance with an embodiment of the invention. In this embodiment of the invention, a typical Zener voltage for a Zener diode as an output voltage clamp is 5.9 V, with a minimum Zener voltage value of 5.8V and a maximum Zener voltage value of 6.0V under a test current value (Izt) of 0.1 amps. The test condition also uses an operating current of 500 micro-amps at 5 V, which meets the USB suspend mode requirement.

Figure 6A:
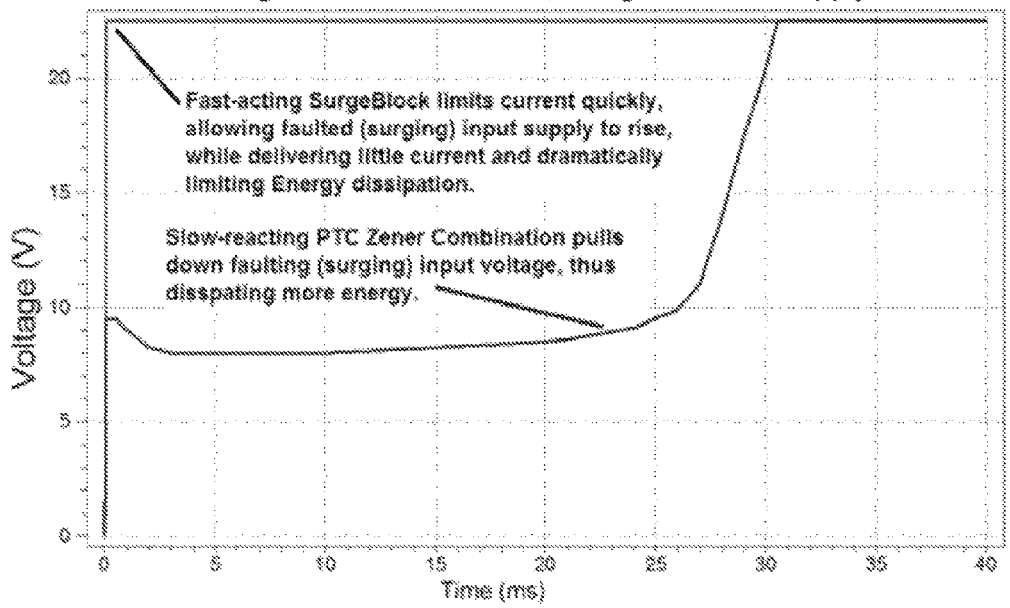
FIG. 6A shows an example of a fault response ($V_{in}$ vs. Time) under a particular test condition for a fast-acting power protection system called "SurgeBlock" in accordance with an embodiment of the invention vs. a conventional PPTC-Zener combination at a surge voltage of 22.5 V and a supply resistance value of 1.25 ohms.

FIG. 6A shows an example of a fault response ($V_{in}$ vs. Time) under a particular test condition for a fast-acting power protection system called "SurgeBlock" in accordance with an embodiment of the invention vs. a conventional PPTC-Zener combination at a surge voltage of 22.5 V and a supply resistance value of 1.25 ohms. As shown in FIG. 6A, the fast-acting power protection system rapidly limits current (relative to time measured in milli-seconds) and allows surging $V_{in}$ to rise while transmitting little current and dramatically limiting energy dissipation. It should be noted that $V_{out}$ will also be clamped to a clamp voltage (e.g. a Zener voltage) of an output voltage clamp (e.g. a Zener diode), thereby protecting an electrical device at the output terminal of the fast-acting power protection system by achieving both current reduction or shut-down and voltage clamping. In contrast, the conventional PPTC-Zener combination pulls down the surging input voltage for an extended period of time (i.e. approximately for 25 milliseconds under this particular test condition), which dissipates more energy and potentially reduces durability of components.

Figure 6B:
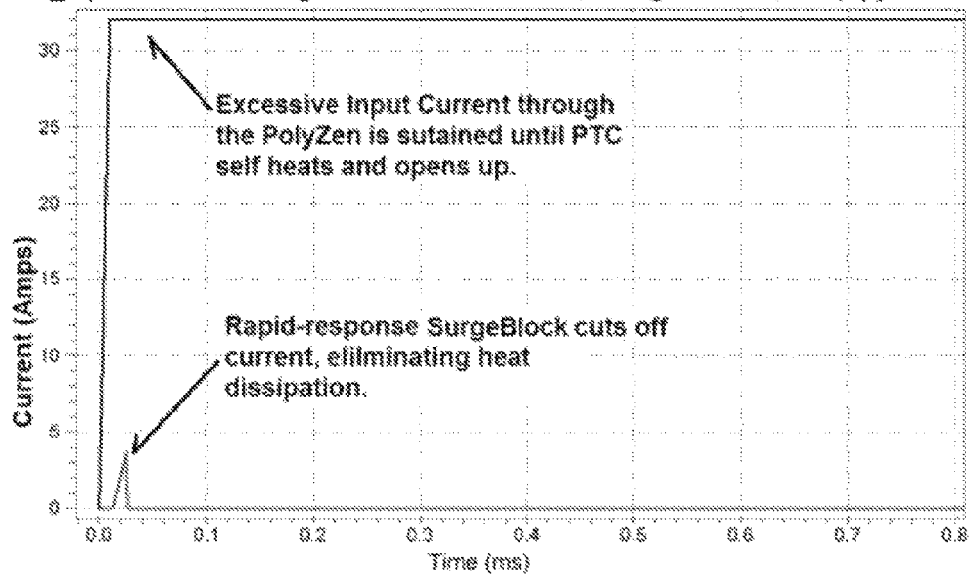
FIG. 6B shows an example of an input current (I_input) vs. time characteristics under a particular test condition for a fast-acting power protection system in accordance with an embodiment of the invention vs. a conventional PPTC-Zener combination at a surge voltage of 22.5 V and a supply resistance value of 1.25 ohms.

FIG. 6B shows an example of an input current (I_input) vs. time characteristics under a particular test condition for a fast-acting power protection system in accordance with an embodiment of the invention vs. a conventional PPTC-Zener combination at a surge voltage of 22.5 V and a supply resistance value of 1.25 ohms. As shown in FIG. 6B, the fast-acting power protection system rapidly shuts down current, thereby minimizing heat (i.e. surge energy) dissipation. In contrast, the conventional PPTC-Zener combination is unable to reduce current in an acceptable amount of time, and allows excessive input current until the PPTC itself is heated up to reduce current, which is beyond the time scale of this graph on the horizontal axis.

One or more embodiments of the power protection system and the related method has been illustrated in FIGS. 1-6B and described above. The present invention provides numerous advantages over conventional power protection designs. For example, one or more embodiments of the present invention uniquely enables fast, durable, and energy-efficient current trip and output voltage clamping by dielectrically isolating a MOSFET for reverse input polarity protection from other MOSFET's for blocking a forward current surge inside the current limiting block in a monolithic semiconductor chip which also integrates the output voltage clamp.

Furthermore, one or more embodiments of the present invention also provides an advantage of providing a scalable small-footprint power protection system which can be incorporated or integrated into a microelectronics device such as a USB device, as illustrated in FIG. 3. In addition, another advantage of the present invention is providing one or more flexible reset modes from a current trip or a output voltage clamping in a power protection system, which may operate under a fault-interrupt mode or a self-recovery mode as a reset option for a novel power protection system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of protecting an electrical device from a power surge, the method comprising the steps of:
   connecting an input terminal of a fast-acting power protector to an electrical source, wherein the fast-acting power protector is a monolithic semiconductor chip integrating an output voltage clamp and a current limiting block, and wherein at least one pair of common-drain series MOSFET's, which blocks a forward current surge, is dielectrically isolated from a MOSFET for reverse polarity protection inside the current limiting block;
   connecting an output terminal of the fast-acting power protector to the electrical device for power surge protection;
   determining whether an incoming electrical current multiplied by a sense resistor value ($R_{sense}$) is approximately equal to a surge protection trigger voltage ($V_{os}$) for a current trip;
   if the incoming electrical current multiplied by the sense resistor value ($R_{sense}$) is approximately equal to the surge protection trigger voltage ($V_{os}$) for the current trip:

using at least one pair of common-drain series MOSFET's and at least one reverse-protection diode in the current limiting block of the monolithic semiconductor chip to reduce or shut down the incoming electrical current as a current surge protection; and if a voltage coming out of the current limiting block is surging higher than a clamp output voltage of the output voltage clamp at the output terminal of the fast-acting power protector:

holding down the voltage coming out of the current limiting block to the clamp output voltage at the output terminal to the clamp output voltage of the output voltage clamp as a voltage surge protection of the electrical device connected to the output terminal of the fast-acting power protector.

2. The method of claim 1, further comprising the step of blocking the incoming electrical current inside the current limiting block using the MOSFET for reverse polarity protection inside the current limiting block, if an input polarity at the input terminal of the fast-acting power protector is reversed or reverse-biased relative to a correct input polarity.

3. The method of claim 1, further comprising the step of allowing the incoming electrical current to follow uninterrupted from the input terminal to the output terminal of the fast-acting power protector, if the incoming electrical current multiplied by the sense resistor value ($R_{sense}$) is less than the surge protection trigger voltage ($V_{os}$) for the current trip and if the voltage coming out of the current limiting block is not higher than the clamp output voltage of the output voltage clamp at the output terminal of the fast-acting power protector.

4. The method of claim 1, further comprising the step of resetting the fast-acting power protector to stop blocking the incoming electrical current if an input voltage into the input terminal of the fast-acting power protector falls below a targeted reset threshold.

5. The method of claim 1, further comprising the step of resuming a flow of the incoming electrical current from the input terminal to the output terminal of the fast-acting power protector after a set period of time, if the current surge protection were triggered previously.

6. The method of claim 1, wherein the output voltage clamp is a Zener diode-based clamp, and the clamp output voltage is a Zener voltage of the Zener diode-based clamp.

7. A fast-acting power protector system for an electrical device, the fast-acting power protector system comprising:

an input terminal configured to receive an incoming electrical current and voltage;

an output terminal configured to transmit an outgoing electrical current and voltage;

a current limiting block comprising a plurality of common-drain series MOSFET's configured to reduce or shut down an incoming electrical current into the input terminal in case of a current trip event, wherein the current limiting block also includes an additional MOSFET for reverse polarity protection;

an output voltage clamp configured to clamp an output voltage at the output terminal to a clamp voltage value if the output voltage begins to surge above the clamp voltage value or another voltage surge protection threshold value; and a single piece of monolithic semiconductor material incorporating the current limiting block and the output voltage clamp, wherein the plurality of common-drain series MOSFET's and the additional MOSFET are dielectrically isolated from each other in the current limiting block to prevent substrate injection and latchup prevention in case of a reverse polarity voltage at the input terminal.

8. The fast-acting power protector system of claim 7, wherein the output voltage clamp is a Zener diode referenced to ground, and the clamp voltage value is a Zener voltage of the Zener diode.

9. The fast-acting power protector system of claim 7, wherein the current limiting block further comprises a first op-amp comparator and a sense resistor ($R_{sense}$) to trigger the current trip event, if the incoming electrical current multiplied by a resistance value of the sense resistor ($R_{sense}$) is approximately equal to the surge protection trigger voltage ($V_{os}$).

10. The fast-acting power protector system of claim 9, wherein the current limiting block further comprises a flip-flop with a set (S) input operatively connected to the first op-amp comparator, a reset (R) input operatively connected to a reset logic, and an output (Q) operatively connected to one or more MOSFET's configured to reduce or shut down the incoming electrical current into the input terminal in case of the current trip event.

11. The fast-acting power protector system of claim 10, wherein the reset logic comprises a second op-amp comparator which compares an input voltage and a targeted reset threshold voltage and outputs a reset enable signal if the input voltage falls below the targeted reset threshold voltage.

12. The fast-acting power protector system of claim 7, wherein the current limiting block further comprises one or more Schottky diodes operatively connected to the plurality of common-drain series MOSFET's for reducing or shutting down the incoming electrical current into the input terminal in case of the current trip event.

13. The fast-acting power protector system of claim 10, wherein the one or more MOSFET's configured to reduce or shut down the incoming electrical current into the input terminal in case of the current trip event are also operatively connected to one or more Schottky diodes which are operatively connected to the plurality of common-drain series MOSFET's.

* * * * *